(12) United States Patent
McMahan et al.

(10) Patent No.: US 7,650,386 B2
(45) Date of Patent: Jan. 19, 2010

(54) COMMUNICATION AMONG PARTITIONED DEVICES

(75) Inventors: Larry N. McMahan, Fremont, CA (US); Gary Belgrave Gostin, Plano, TX (US); Joe P. Cowan, Ft. Collins, CO (US); Michael R. Krause, Boulder Creek, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1025 days.

(21) Appl. No.: 10/902,362

(22) Filed: Jul. 29, 2004

(65) Prior Publication Data

US 2006/0026443 A1 Feb. 2, 2006

(51) Int. Cl.
*G06F 15/167* (2006.01)
*G06F 12/00* (2006.01)
*G06F 13/00* (2006.01)
*G06F 13/28* (2006.01)

(52) U.S. Cl. .............. 709/213; 709/215; 711/147; 711/152; 711/153; 711/129

(58) Field of Classification Search ......... 709/213–216; 719/312
See application file for complete search history.

(56) References Cited

U.S. PATENT DOCUMENTS

| 4,916,658 | A |   | 4/1990 | Lee et al. |
| 6,134,607 | A | * | 10/2000 | Frink ........................... 710/22 |
| 6,332,180 | B1 | * | 12/2001 | Kauffman et al. ........... 711/153 |
| 2002/0144010 | A1 | * | 10/2002 | Younis et al. ............... 709/314 |
| 2003/0182464 | A1 | * | 9/2003 | Hamilton et al. ............ 709/314 |

FOREIGN PATENT DOCUMENTS

| JP | 2-125359 | 5/1990 |
| JP | 2516317 | 1/1999 |
| JP | 2002-215407 | 8/2002 |
| JP | 2003-271402 | 9/2003 |
| JP | 2004-5443 | 1/2004 |
| JP | 2006-503361 | 1/2006 |
| WO | 2004/036422 A2 | 4/2004 |

OTHER PUBLICATIONS

IEEE Society, "IEEE Standard for Communicating Among Processors and Peripherals Using Shared Memory (Direct Memory Access—DMA)", 1994, IEEE, IEEE Std 1212.1-1993, pp. i-vi, 3-8, 22-24, 40, 108-109.*

(Continued)

*Primary Examiner*—Thuha T. Nguyen
*Assistant Examiner*—E. W. S.

(57) ABSTRACT

A computing device having partitions, and a method of communicating between partitions, are disclosed wherein each partition comprises at least one address area readable but not writable from the other of the at least two partitions. In one embodiment one partition sends to the other partition a request for information, which information is in the other partition in an address area not accessible to the one partition, the other partition copies the information to an address area accessible to the one partition, and the one partition reads the information from the accessible address area. In another embodiment the at least one accessible address area of each partition includes a data area and a consumer pointer indicating the position to which that partition has read the data area in another partition.

24 Claims, 11 Drawing Sheets

OTHER PUBLICATIONS

Patent Abstract and English Translation of JP 2002-215407.
English Translation of JP 2006-503361.
Patent Abstract and English Translation of JP 2516317 (Publication 06-266570 - Application No. 05-246744).
Patent Abstract of JP 02-125359.
Patent Abstract and English Translation of JP 2003-271402.
Patent Abstract of JP 2004-005443.
Japanese Application No. 2005-213849 Notice of Rejection dated Nov. 21, 2006 and English Translation of same, 6 pages.
Japanese Application No. 2005-213849 Decision of Refusal dated May 21, 2007 and English Translation of same, 4 pages.

* cited by examiner

| OFFSET | 7 | 6 | 5 | 4 | 3 | 2 | 1 | 0 |
|---|---|---|---|---|---|---|---|---|
| 0 | GUID (FIRST 4 BYTES) 56 | | | | TYPE 54 | LENGTH 52 | | RES 50 |
| 8 | GUID (CONTINUED) | | | | | | | |
| 16 | RESERVED | | CELLS 60 | REV. 58 | GUID (LAST 4 BYTES) | | | |
| 24 | CELL 0 CSR BASE ADDRESS | | | | | | | |
| 32 | CELL 0 LOWER BOUND FOR VALID WINDOWS | | | | | | | |
| 40 | CELL 0 UPPER BOUND FOR VALID WINDOWS | | | | | | | |
| | ... | | | | | | | |
| 24i+24 | CELL i CSR BASE ADDRESS 62i | | | | | | | |
| 24i+32 | CELL i LOWER BOUND FOR VALID WINDOWS 64i | | | | | | | |
| 24i+40 | CELL i UPPER BOUND FOR VALID WINDOWS 66i | | | | | | | |
| | ... | | | | | | | |
| 24N+24 | CELL N CSR BASE ADDRESS | | | | | | | |
| 24N+32 | CELL N LOWER BOUND FOR VALID WINDOWS | | | | | | | |
| 24N+40 | CELL N UPPER BOUND FOR VALID WINDOWS | | | | | | | |

FIG. 12

COMMUNICATION AMONG PARTITIONED DEVICES

BACKGROUND

In computers and other data handling systems, it is sometimes desirable to partition parts of the system from one another. "Partitioning" denotes an arrangement in which a larger system is divided into parts that are not totally isolated, but in which access from one partition to another is restricted. Partitioning may for example be used to reduce the risk that a malfunction in one partition will interfere with the working of another partition. Partitioning may for example be used to reduce the risk that malicious activity in one partition can interfere with other partitions. Partitioning may for example be used to simplify programming, by enabling a programmer to ignore the existence of other partitions.

However, for some purposes it may be necessary or desirable for different partitions to communicate. Communication may then take place without unduly weakening the partitioning.

SUMMARY

In one embodiment of the invention, communication between partitions comprises permitting each of two partitions to read from, but not to write to, a respective accessible memory area in the other of the two partitions, and maintaining in each of those memory areas a pointer indicating the position to which that partition has read the accessible address area in the other partition.

In another embodiment of the invention, a first and a second partition communicate by the first partition placing information in an address area in the first partition accessible to the second partition. The first partition sends to the second partition a signal to indicate that there is information in the accessible address area. The second partition reads the information from the accessible address area.

In another embodiment of the invention, first and second partitions in a partitioned computer system have respective first and second memory windows that the other partition is permitted to read. The second partition displays within the second window a window interrupt. The first partition defines within the first window a first communication channel, and displays a first channel interrupt. The first partition sends to the second partition the window interrupt for the second window. The second partition receives the window interrupt and locates the first channel. The second partition defines within the second window a second communication channel and displays a second channel interrupt. The second partition sends the first channel interrupt to the first partition. The first partition locates the second channel within the second window. The first and second partitions communicate using the first and second channel interrupts and information displayed in the first and second channels.

The computing device may be a computer, or a group of cooperating computers.

BRIEF DESCRIPTION OF THE DRAWINGS

For purposes of illustrating the invention, the drawings show one or more forms in which the invention can be embodied. The invention is not, however, limited to the precise forms shown. In the drawings:

FIG. 12 is a block diagram of an embodiment of fields within an Advanced Configuration and Power Interface (ACPI) table.

DETAILED DESCRIPTION

Figure 1:
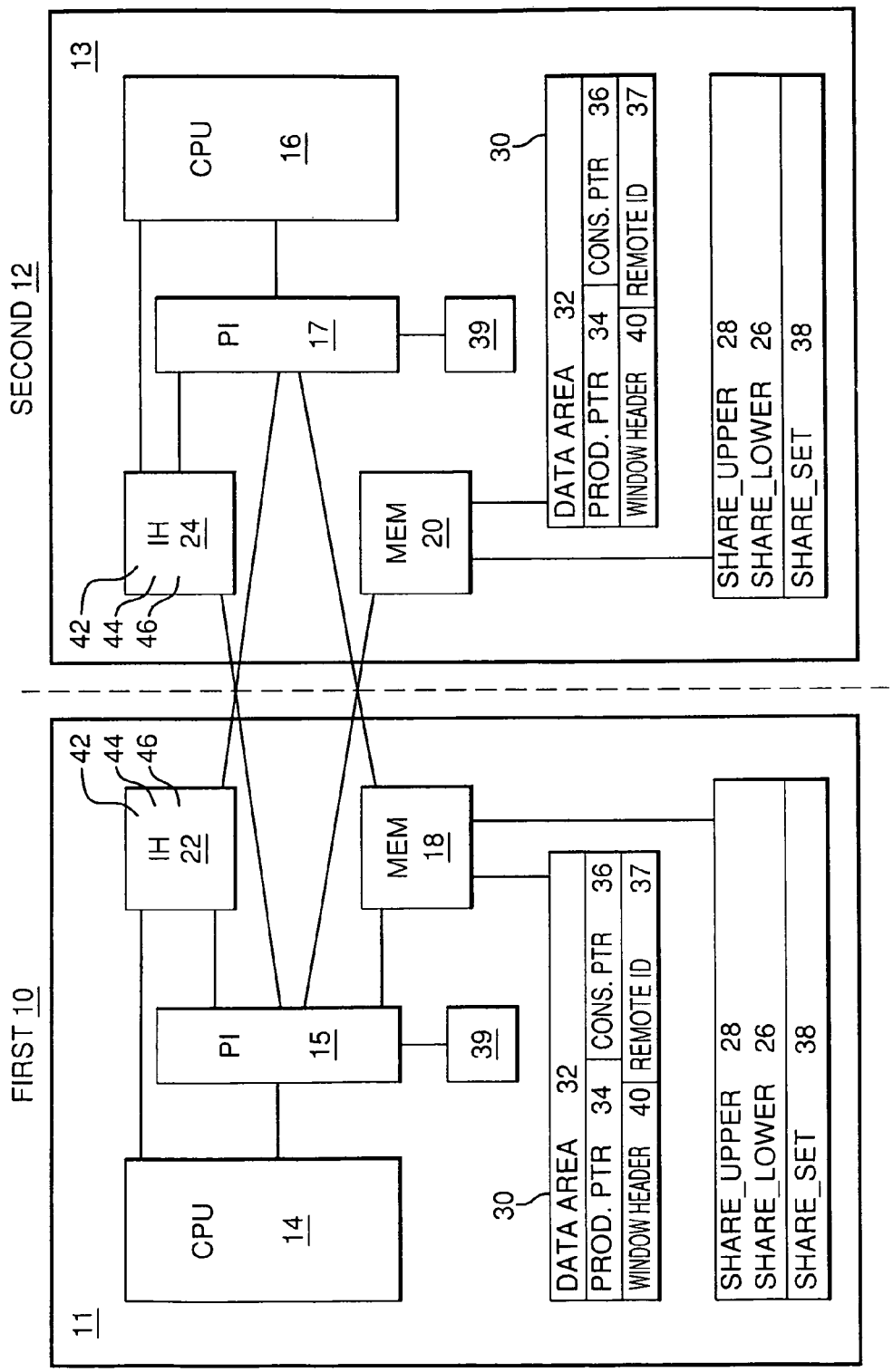
FIG. 1 is a block diagram of one form of computer system according to an embodiment of the invention.

Referring to the drawings, and initially to FIG. 1, one embodiment of a computer system according to the invention comprises a plurality of cells or partitions. In the present embodiment, a "cell" is a physical subdivision of a larger computer system, typically containing a central processing unit, with an address space including physical memory, and various peripheral and ancillary devices. In the present embodiment, each cell contains one or more processors. In the present embodiment, incoming communications are controlled primarily at the level of the cell. A "partition" is an administrative subdivision of a larger computer system that functions largely independently of, and has restricted access to, other partitions. In the present embodiment, each partition may have one or more cells.

Two partitions 10 and 12 are shown in FIG. 1, each comprising at least one cell 11, 13, respectively. Each cell 11, 13 comprises at least one central processing unit (CPU) 14, 16, respectively, a processor interface 15, 17, respectively, a memory controller 18, 20, respectively, and an interrupt handler 22, 24 respectively. The two partitions may be substantially identical structurally. The two partitions may run the same operating system. However, because, as is described below, the interactions between the two partitions 10, 12 are very limited, the two partitions may be structured differently and/or may run different operating systems, provided that each is capable of implementing and using the structures and methods described.

In this embodiment, interrupts to be transmitted from one partition to the other are passed from the originating CPU 14, 16 to the "local" processor interface 15, 17 in the same cell. The processor interface 15, 17 then passes the interrupt to the interrupt handler 24, 22 of the destination cell, which may pass the interrupt directly to the destination CPU 16, 14. Otherwise, each processor interface 15, 17 is in communication with the CPU 14, 16, the memory controller 18, 20, and the interrupt handler 22, 24 in its own cell, and with the memory controller 20, 18 in the other cell 13, 11. The processor interfaces 15, 17 are in communication with different partitions in any convenient manner over a data link that spans the different partitions 10, 12.

The memory controller 18, 20 of each cell 11, 13 has access to at least one pair of address registers 26, 28 and a sharing set register 38 (collectively referred to as "sharing registers") at a fixed address location. Each pair of address registers 26, 28 contain the addresses of the lower and upper bounds of a sharing window 30, which is an address area, typically an area of physical memory, that is accessible to other partitions. The sharing set register 38 contains a list of cells in the system from which requests to read memory may originate, indicating which of them are permitted to read the associated sharing window 30. In the interests of simplicity, FIG. 1 shows only one cell 11, 13, one sharing window 30, and its associated sharing registers in each of two partitions 10, 12. In this embodiment, however, there may be several cells and there may be several sharing windows 30 in each cell. Each cell may then use different sharing windows 30 for communication with different other cells or partitions. As will be explained below, there is not necessarily a one-to-one matching of sharing windows 30 to cells or partitions.

In this embodiment, the operating system running on each CPU 14, 16 obtains from firmware 39 the locations of all of the sharing registers 26, 28, 38 in the system. In this embodiment, each CPU 14, 16 is provided with a base or starting address for the entire set of sharing registers 26, 28, 38 for each other cell that it may need to communicate with. Each CPU 14, 16 can then find all the sharing registers in each other cell by assuming they have the same arrangement as the sharing registers in the local cell. Alternatively, the CPU 14, 16 may be provided with a data file containing the layouts for the sharing registers in each other cell with which that CPU may communicate. Alternatively, in a symmetrical system, the sharing registers 26, 28, 38 may be at symmetrical locations within their respective partitions. Each CPU then needs to be provided only with the address range for each partition (which it usually needs for other purposes) and an offset from the partition base address to the location of the sharing registers 26, 28, 38. In this embodiment, if a partition contains more than one CPU, the information is held in a single location in the partition from which it can be accessed by all the CPUs in the partition. In an asymmetrical system, a central supervisory processor (not shown) may have the responsibility of maintaining and distributing a reliable list of register locations.

In normal operation of the computer system, each memory controller 18, 20 may substantially always permit CPUs in other partitions ("remote" CPUs) to read the sharing registers 26, 28, 38 in the memory controller's own partition. Alternatively, the memory controller 18, 20 may permit a remote CPU to read the registers only if the sharing set register 38 shows that the specific remote CPU is allowed access to the associated sharing window 30. The memory controllers 18, 20 do not permit a CPU in one partition to alter the contents of a register in another partition.

The memory controller 18, 20 may permit remote CPUs to read the contents of a sharing window 30 in the memory controller's own partition. The sharing set register 38 associated with a window 30 identifies which remote partitions are permitted to read the contents of that window. Only the sharing window's local CPU 14, 16 may alter the contents of the sharing window 30. The memory controller 18, 20 does not permit a remote CPU any access to any part of its address space apart from a sharing window that the specific remote CPU is authorized to access and the sharing registers 26, 28, 38. A request to read is allowed only if the request both specifies an address range within a sharing window 30 and originates from a remote CPU that is authorized to read that sharing window.

In the embodiment shown in FIG. 1, each sharing window 30 contains a window header 40, a send queue or data area 32 for data to be transferred from one partition to another, and a producer pointer 34, which indicates the position in the data area 32 up to which the local processor has written valid data. Each sharing window 30 also contains a consumer pointer 36 and a remote channel identification (ID) 37.

Communication between two CPUs 14, 16 in different partitions is possible by each CPU placing messages in the send queue 32 of a sharing window 30 in its own partition and permitting the other CPU to read them. Each CPU then uses the producer pointer 34 to indicate newly written data, and uses the consumer pointer 36 to indicate how much it has read of the data provided by the other CPU. Because a CPU cannot change data in the other CPU's partition, it uses the consumer pointer 36 in its own sharing window 30 to signal how much it has read of the remote send queue 32. Each CPU 14, 16 may send an interrupt to the interrupt handler 24, 22 of the other CPU to alert the other CPU when the sending CPU has placed new data waiting to be read in the send queue 32 in the sending CPU's partition.

When a pair of sharing windows 30 are allocated to a conversation between a specific pair of CPUs, in this embodiment each CPU displays (i.e., writes) information relating to the identity of the other CPU in the remote channel ID 37 in its own sharing window 30. The information may include one or more of a partition number, a node or cell number, and a window number within a cell. This serves as a confirmation to the remote CPU in question, and as a warning to any other CPU that may be permitted to read that sharing window, that the window is allocated to the specific conversation.

Figure 2:
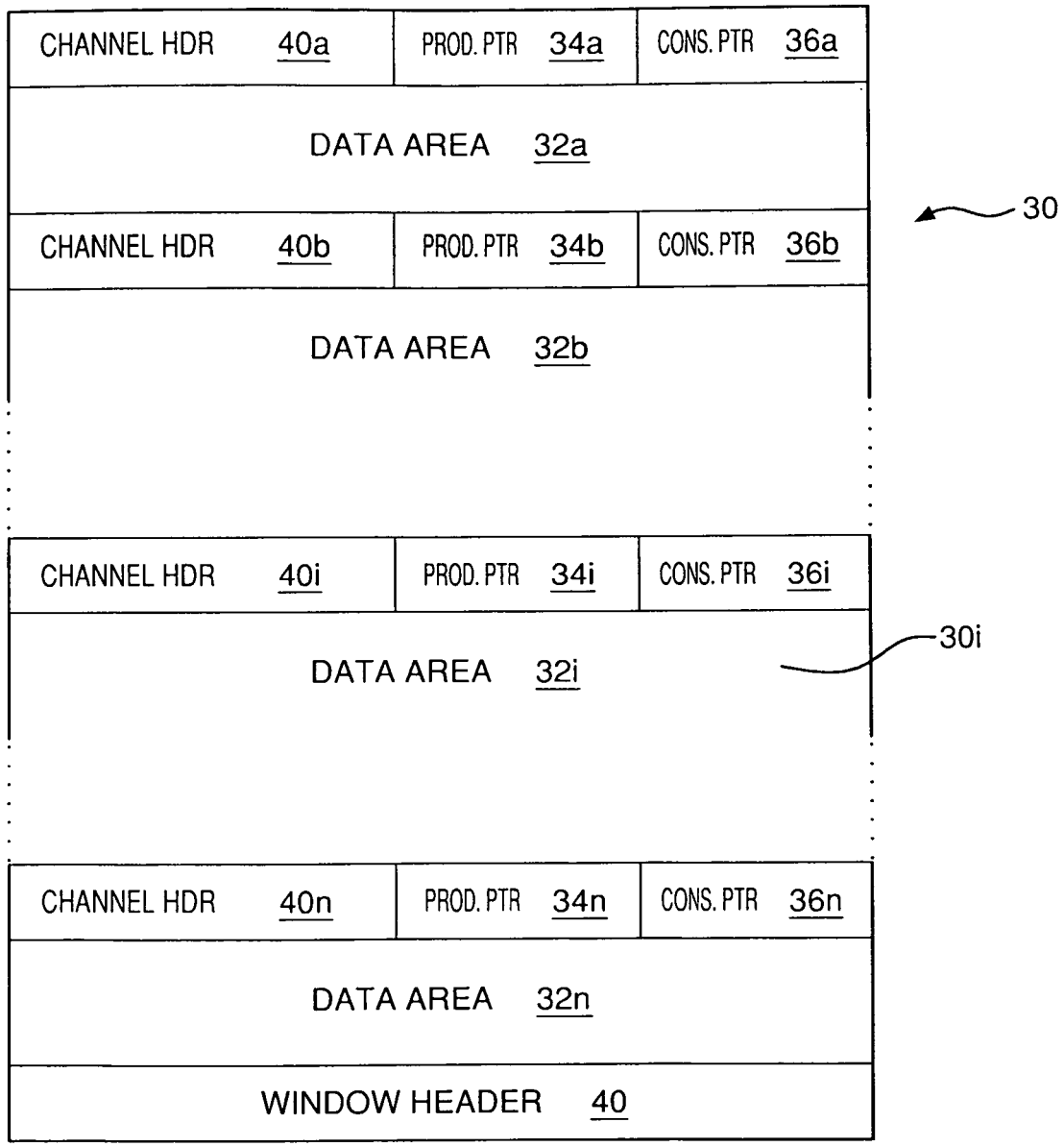
FIG. 2 is a block diagram of fields within a window in an embodiment of the invention.

Referring now to FIG. 2, in a second embodiment of the computer system, a sharing window 30 may be divided into several channels 30i. Each channel has a send queue or data area 32a, 32b . . . 32i . . . 32n, a producer pointer 34a, 34b . . . 34i . . . 34n, a consumer pointer 36a, 36b . . . 36i . . . 36n, and a channel header 40a, 40b . . . 40i . . . 40n. The number of channels within a window may be determined according to the circumstances of a particular case. The number of channels may be fixed, and uniform for all sharing windows in a system, or it may be determined window by window. If it is determined window by window, the information may be cached by the two processors using that window, or recorded in a window header 40 within the sharing window 30 but not allocated to any specific channel.

Individual channels within a sharing window 30 may be assigned to different operating systems or other substantially independent processes running on a single processor 14, 16, and/or to different processors within a single cell. This saves the overhead that would be necessary to allow the different processes to use a single channel as a shared resource, while avoiding the complications of having several separate sharing windows between the same pair of processors. The procedure for communicating using pairs of channels within a pair of sharing windows 30 is then substantially similar to the process described above for communicating using pairs of sharing windows. Alternatively, separate channels may be used to enhance the capacity and flexibility of data transfer between a pair of processors 14, 16.

Alternatively, different channels within a single window 30 may be assigned to communication between the local processor and different remote processors. This has the advantage of reducing the number of sets of sharing registers 26, 28, 38.

Using a single window for communication with more than one remote processor has the disadvantage of a reduction in privacy, because access to the sharing windows 30 is controlled for each window, so that a remote processor can read all communications in the same window, including those in channels for other processors. However, because a remote processor cannot alter the contents of a sharing window, it cannot alter or disrupt communications between two other processors.

In this embodiment the sharing registers 26, 28, 38 are located in the memory controllers 18, 20 at addresses that are defined in the firmware 39, and are initially set to a state where the lower and upper bounds registers 26, 28 do not identify a valid window 30, and the sharing set register 38 is initially set to a status where no other partition is allowed access to that "window."

Each cell 11, 13 has a copy of a set of devices or objects, which in this embodiment are ACPI (Advanced Configuration and Power Interface) firmware devices or objects, from which configuration information is loaded when the cell CPU boots up. The first ACPI device provides the addresses of the sharing registers 26, 28, 38 within that CPU's own memory controller 18, 20. If the sharing registers form a contiguous block, and the number, size, and order of the registers is otherwise defined, a single address for the beginning of the block may be sufficient. In this embodiment, however, each register is explicitly defined, and the set of three sharing registers for each window 30 is defined as an ACPI device. Expressed in source code, a typical one of the ACPI device definitions might read:

```
Device(GSMx) // Sharing Window x
{
    Name(_UID, x)
    Name(_HID, EISAID("HWP1001"))
    Name(_CRS, ResourceTemplate( )
    {
        Register(SystemMemory, 64, 0, 0xfed1280) //
        SHARE_LOWER
        Register(SystemMemory, 64, 0, 0xfed1300) //
        SHARE_UPPER
        Register(SystemMemory, 64, 0, 0xfed1200) //
        SHARE_SET
    } ) // _CRS
}
```

The character x represents an identifying number for the window, and must be unique within the cell. The typical hexadecimal addresses, which are the starting address for each register, are of course different for each window 30. In this example, sixteen contiguous SHARE_SET registers, sixteen contiguous SHARE_LOWER registers, and sixteen contiguous SHARE_UPPER registers may form a block of contiguous registers, but other arrangements are possible. In the ACPI hierarchy, the GSMx devices are assigned immediately below the "node" or cell to which they belong.

Figure 3:
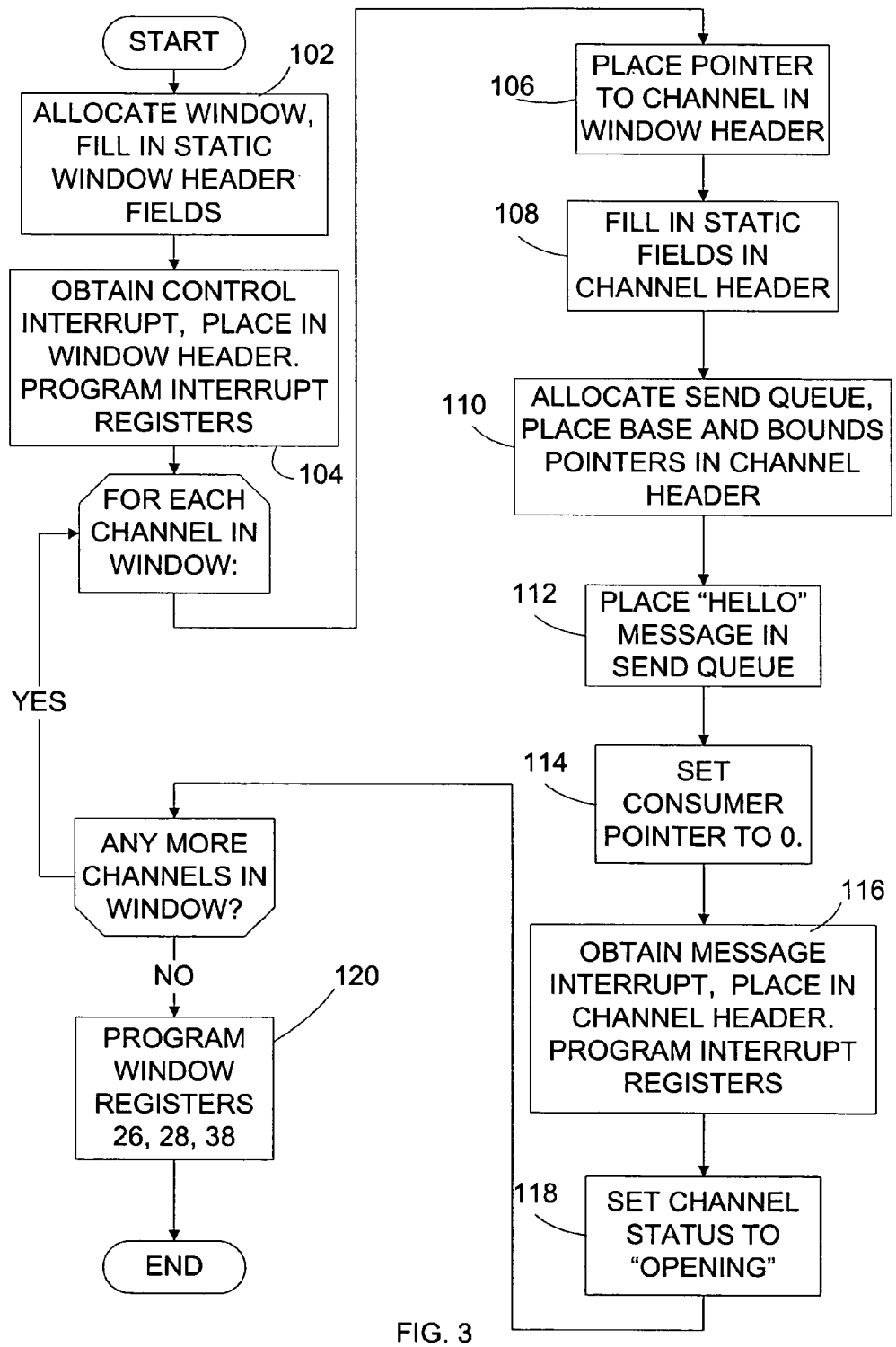
FIG. 3 is a flowchart of an embodiment of a process for setting up sharing windows and channels within a local partition.

Referring now to FIG. 3, in this embodiment, if the CPU 14 of a first partition 10 wishes to exchange information with a second partition 12, at step 102 the first partition 10 allocates memory space for a sharing window 30 and sets up the window header 40 with "static" information that does not need to be agreed with the second partition, and will not change as long as the window exists. The "static" header may include the remote channel ID 37 if there is a single channel in the window, and, at this stage, the first partition knows that information for the remote partition 12 with which the sharing window 30 is to be used. The physical memory allocated for the sharing window 30 may be any available memory within the first partition 10. However, if the first partition 10 has more than one cell, it is preferred for the sharing window 30 to be in memory that is entirely within the cell of the controlling CPU 14 and memory controller 18, so that the memory controller 18 has complete control over the sharing window 30. If memory that is interleaved over more than one cell is used, control of that memory is typically shared between the memory controllers 18 of the cells involved, and integrity is less easily ensured.

At step 104, the first cell 11 assigns an interrupt vector for a Window Control Interrupt, and determines what action is to be taken when that interrupt is received. This may include specifying which processor 14 the vector is to be sent to, if the cell 11 contains more than one processor. In the present embodiment, the Window Control Interrupt has a specified vector sent to a specified processor. The same vector sent to a different processor in the cell, or a different vector sent to the same processor, is not recognized as the same Window Control Interrupt, and may have an independently assigned function. The first partition 10 then displays the interrupt vector and the address of the target processor in the window header 40, where they can be read by any other cell permitted to access that window 30.

The identities of interrupt vectors and target processors are loaded into appropriate registers in the interrupt handler 22 in the first cell 11. A second ACPI device provides the addresses of the registers. Expressed in source code, the ACPI device definition might read:

```
Device(GSMI)
{
    Name(_UID, 0x0)
    Name(_HID, EISAID("HWP1002"))
    Name(_CRS, ResourceTemplate( )
    {
        Register(SystemMemory, 64, 0, 0xfed0f10)//
        INT_TARGET_ENABLE
        Register(SystemMemory, 64, 0, 0xfed01c8)//
        INT_VECTOR_ENABLE_0
        Register(SystemMemory, 64, 0, 0xfed01d0)//
        INT_VECTOR_ENABLE_1
        Register(SystemMemory, 64, 0, 0xfed01d8)//
        INT_VECTOR_ENABLE_2
        Register(SystemMemory, 64, 0, 0xfed01e0)//
        INT_VECTOR_ENABLE_3
        Register(SystemMemory, 64, 0, 0xfed0138)//
        INT_ERROR_VECTOR
    } ) // _CRS
}
```

INT_TARGET_ENABLE is a register 42 listing processors within the cell 11 to which interrupt vectors from outside the partition 10 may be forwarded. The four INT_VECTOR_ENABLE registers 44 list interrupt vectors that may be forwarded to processors within the cell. An incoming interrupt will be forwarded to the target processor only if both the INT_TARGET_ENABLE register 42 and the INT_VECTOR_ENABLE register 44 show that interrupt as allowable. Each of those registers has one bit assigned to each possible target or vector, which bit may be set to allow or deny an incoming interrupt. There are four INT_VECTOR_ENABLE registers 44 because in this example the interrupt vector is 8 bits long, so there are 256 possible interrupt vectors, requiring 256 register bits, but the register definitions in this example are limited to 64 bits per register. The INT_ERROR_VECTOR register 46 contains an error vector which, as is explained below, may be substituted for the vector of an interrupt that is allowed by the INT_TARGET_ENABLE register 42 but denied by the INT_VECTOR_ENABLE register 44. In the ACPI hierarchy, the GSMI device is assigned immediately below the "node" or cell to which it belongs.

When the Window Control Interrupt for a sharing window 30 is assigned, the cell 11 sets the appropriate bits to allow the assigned interrupt vector to be forwarded to the assigned target processor, if those bits are not already set to allow forwarding.

The first partition may at this stage define the channels within the sharing window 30. For each channel in the window, at step 106 the first processor 14 then places a pointer giving the address of the channel header 40*i* in the window header 40. At step 108, the first processor 14 then fills in the "static" information in the channel header. In this embodiment, each CPU 14, 16 is provided with a database of pairs of channels for communication between the local cell of the partition in question and other cells in the system. The static data for each channel may therefore include data identifying a specific channel in a specific remote partition. Alternatively, the channel pairing may be left open until communication is actually established.

At step 110, memory is allocated for the data area or send queue 32*i* of the channel in question, and pointers specifying the lower and upper bounds of the send queue are written into the channel header. At step 112, a "hello" message is placed in the send queue 32*i*. At step 114, the consumer pointer 36*i* of the channel is set to 0, showing that the first partition 10 has not yet found and started to read the corresponding remote channel's send queue.

At step 116, the first partition 10 assigns a channel interrupt, following essentially the same process described above with reference to step 104, sets the necessary bits in the INT_TARGET_ENABLE and INT_VECTOR_ENABLE registers, and displays the target processor and interrupt vector in the channel header 40*i*. At step 118, a channel status flag is set to show that the channel is "opening," that is to say, that it has been set up but not yet connected to a channel in a remote partition 12.

If the sharing window 30 is never intended to have more than one channel, then the channel header and the window header may merge, and in particular steps 102 and 108, and steps 104 and 116, may merge. The sharing window 30 may then have the configuration shown in FIG. 1, with a single data area 32, a single producer pointer 34, and a single consumer pointer 36.

Once the sharing window 30 is completely set up, at step 120 the lower and upper bound registers 26, 28 are set to identify the address range of the window 30 and the sharing set register 38 is set to identify the partition or partitions that are permitted to access the sharing window.

The process shown in FIG. 3 may be carried out when the first partition 10 is initially booted up, or when a need for actual communication with a relevant second partition 12 arises.

The first CPU 14 may set up a sharing window 30 for a specific second partition 12, as shown in FIG. 3, when it has occasion to communicate. The first CPU 14 will then immediately attempt to locate a corresponding window 30 on the intended second partition 12. Instead, each CPU 14, 16 may set up sharing windows 30 for other partitions (effectively, every other partition in the system with which that CPU is ever permitted to communicate), as shown in FIG. 3, at startup. Each CPU 14, 16, once it has set up its own sharing windows 30, then proceeds to locate corresponding windows in other partitions.

Figure 4:
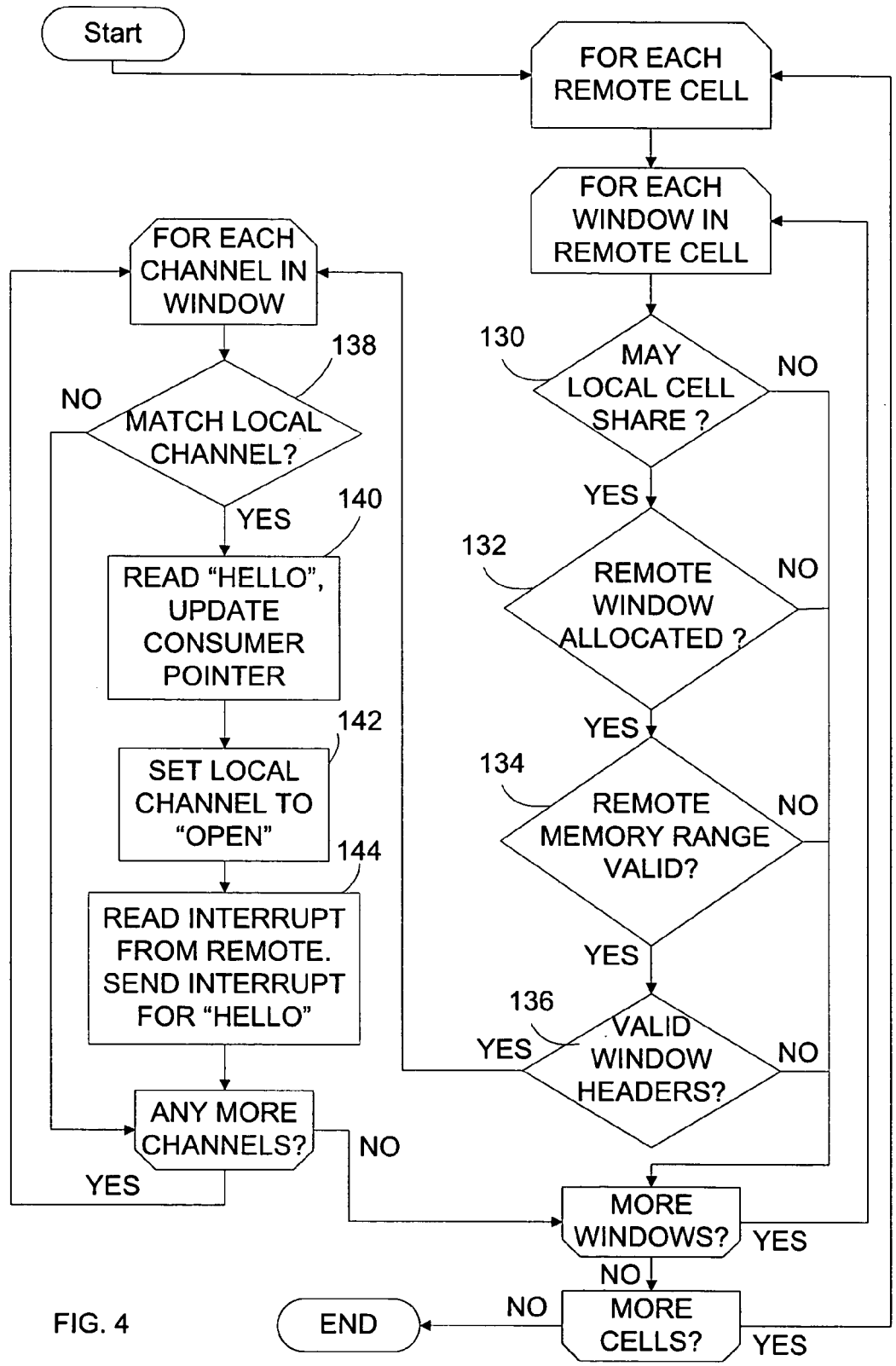
FIG. 4 is a flowchart of an embodiment of a process for locating available channels within a remote partition and establishing communication therewith.

Referring now to FIG. 4, in the present embodiment, at step 130, in order for the first CPU 14 to determine what sharing windows are available to it on the second partition 12, the first CPU 14 obtains the locations of sharing registers on possible second partitions from an ACPI firmware object, and sends out requests to read the sharing set register 38 of each remote sharing window 30. Referring to FIG. 12, the ACPI firmware object is not defined as a true ACPI device, because the ACPI standard is restricted to devices in the same partition as the operating system that invokes the devices. The table shown in FIG. 12 is defined under the ACPI standard as a "vendor long" object that is entirely defined by the individual manufacturer. The fields in the table are defined as follows. The table shown in FIG. 12 contains information on all cells that may have sharing windows, and is available globally to all of those cells. The ACPI standard is available at http://www.acpi.info.

RES is an ACPI defined 1 byte value 50 that tells software what this resource is. The value is 0x84, meaning that the resource is a vendor defined object. LENGTH is a 2 byte value 52 giving the length of the GSM Register "data area" measured in bytes (not including the 3 bytes occupied by the RES and LENGTH values). In the present example, where three 64-bit (8-byte) addresses are listed for each cell, this value is equal to 24*N+21, where N is the number of cells listed. TYPE is a "subtype indicator" 54 that is used with a GUID 56 to tell what kind of resource this is. The TYPE field is a standard ACPI field, but the value is chosen by the designer of the individual object. The GUID (Globally Unique IDentifier) 56 is a 16 byte standard ACPI field the value of which is determined by the individual manufacturer. GUIDs are "globally unique" in the sense that they are generated in such a way that no two manufacturers can accidentally generate the same number.

REV is a 1 byte value 58 giving the revision of the table. If the definition of the table changes, this number must be incremented. CELLS is a 1 byte value 60 giving the number N of cells represented in the table.

The rest of the fields in the table are all 8 bytes in length, and represent addresses. For each cell there are three addresses. There are as many of these groups of three addresses as there are cells in the entire machine (counting all partitions). The three addresses for each cell are as follows.

Cell i GSM CSR (Control and Status Register) Base Address 62*i* is a base address from which all of the GSMx CSRs for cell i can be computed. In the example GSMi device given above, the CSR Base Address is the starting address of the SHARE_SET register 38 for the first GSM device. This value allows the first cell 11 to find all of the sharing windows in all of the remote cells and check to see if they allow sharing with the local cell.

Cell i Lower Bound for Valid Windows 64*i* is the smallest valid address for a sharing window on cell i. Cell i Upper Bound for Valid Windows 66*i* is the largest valid address for a sharing window on cell i. If the range of addresses between these two bounds is less than the whole of the physical memory available to the cell, then at step 102 the first cell 11 must ensure that cell i has placed the sharing window 30 within the valid range for its own cell that is specified by the FIG. 12 table.

If the first CPU 14 is entitled to access that remote sharing window 30, it receives back a copy of the sharing set register 38 with the bit indicating the status for the CPU 14 set to "allow." In the present embodiment, if the first CPU 14 is not entitled to access that sharing window, it receives back an error signal indicating an inadmissible request.

Alternatively, the first CPU 14 may receive back a copy of the sharing set register 38 for the remote window 30 with the requesting CPU's bit set to "deny." If the remote window 30 has not yet been initialized as shown in FIG. 3, the first CPU receives back either an error signal or a copy of the remote sharing set register with all bits set to "deny." In the present embodiment, all error signals consist of an "all 1's" or "−1" signal. It is therefore preferable for the "deny" bit to be a 1.

If the first partition 10 has received a favorable response from the remote window's sharing set register 38, at step 132 the first partition 10 then inspects the address registers 26, 28 of the remote window within partition 12. To define a meaningful window 30, the upper bound must be greater than the lower bound. There may be other constraints, such as that the window must be of a certain size or must be aligned with memory boundaries. A pair of address registers that do not comply may be used deliberately to indicate that the associated sharing window 30 is unavailable, or may be symptomatic of a problem in the second partition 12.

If the sharing window 30 defined by the SHARE_LOWER address register 26 and the SHARE_UPPER address register 28 on the second cell 13 is meaningful, at step 134 the first cell 11 must check the values read from both the registers 26, 28 and validate that the values are as large as the second cell's Lower Bound for Valid Windows, obtained from the table of FIG. 12. The first cell 11 must also check those values and validate that the values are smaller than the second cell's Upper Bound for Valid Windows, obtained from the table of FIG. 12. Validating the addresses in the second cell 13's registers 26, 28 against the table of FIG. 12 reduces the risk that erroneous entries will result in the first processor 14 attempting to read an inappropriate area of memory, for example, memory that is inaccessible, non-existent, and/or not in the second partition 12. Such inappropriate read attempts can delay the operation of the first processor, and may in some circumstances result in an error state that is difficult to recover from.

If there is a valid sharing window address, at step 136 the first partition 10 sends the second partition 12 a request to read the window header 40 of that sharing window. If valid data is received, the first partition 10 proceeds to inspect the channels within the window 30.

If the remote channel headers are valid, at step 138 the first CPU 14 checks for a channel available for its use in that remote window 30. Depending on the amount of information available at steps 102 and 108, each local channel in the first partition may be pre-allocated to a specific remote channel in a specific window of the remote second partition 12, or channels in the second remote partition may be to some extent unallocated. If channels are fully pre-allocated, then the first CPU 14 continues searching unless and until it finds the remote channel allocated to it. The first CPU 14 checks that the status of the remote channel is "opening," as set in step 118. In any case, the first partition fills in a channel ID in its local sharing window in a Channel ID field of the Channel Header 40i. If the remote window in the second partition is preallocated, the first partition fills in the channel ID of the remote second partition in a Remote Channel ID field of the first partition's Channel Header in the first partition's local sharing window. If the remote channel is not preallocated, the local first partition fills in OS Instance, Locality, and Window# fields of the Remote Channel ID field in its local sharing window, and places a value of 255 in the Channel# field of its Remote Channel ID to denote an unspecified channel.

Once a valid channel in a valid remote sharing window 30 is identified, the first partition 10 preferably caches its address, so that the first partition does not need to read the address registers 26, 28 of the remote partition repeatedly. This occurs only in the case where preallocated channels are used.

At step 140, the first processor 14 then reads the "hello" message from the remote channel, and updates its consumer pointer 36 to point to the end of the "hello" message, showing that the first processor has read the message. At step 142, the first processor 14 then sets the status of its corresponding channel to "open," showing that the channel has been matched up to a channel on another cell and is available for communication. However, at this stage the second CPU 16 is not aware that the channels have been matched up, and the channel in the second partition 12 still has the status of "opening" assigned in step 118 when the second CPU set up the channel.

At step 144, the first processor 14 reads from the remote channel header the channel interrupt target processor address and interrupt vector for the channel. The first processor 14 then sends that interrupt vector to that target processor via the interrupt handler 24, alerting the second processor 16 to read the "hello" message from the channel in the first partition 10.

If the first partition has not found a preallocated channel, and wishes to ask the second, remote partition to allocate a channel in the remote window, the first partition will read the second partition's Window Control Interrupt vector and address, as placed in the remote window in step 104, and send the second partition the Window Control Interrupt.

As shown for simplicity in FIG. 4, the first processor 14 proceeds to inspect every channel in every window in every cell of the entire computer system, and to set up all possible pairs of channels for communication. However, where the sharing set register 38 for a sharing window 30 does not allow that first processor 14 access to that window, the first processor can immediately skip to the next window. In addition, the first processor 14 usually knows how many channels, in how many windows, it should have available on each remote cell. Consequently, when it has filled its quota, it may skip unnecessary tests. For example, if the first processor 14 knows that it should have only one channel available on a second cell 13, once that channel has been identified and opened the first processor can skip immediately to the next target cell. For example, if the first processor 14 knows that it should have all the channels in one remote window 30 available to it, once the first processor 14 has found the correct window, it may set up all the channels in that window but can skip the other windows of the same cell. Alternatively, if the first processor 14 is attempting to set up a communication path for a specific purpose, it may search only those sharing windows 30, typically the sharing window or windows in the cell or cells on a specific remote partition 12, that would be useful for the specific purpose.

If an error message, or an inapplicable remote channel ID 37, is received from every sharing window 30 in the second partition 12, the first partition 10 concludes that no channel is available for it on the second partition 12. Because of the constraints imposed by the present system, in that case the first partition 10 can suspend its attempts to communicate unless and until the intended second partition 12 sets up a suitable channel. If the first CPU 14 is setting up its sharing windows 30 at startup, it may fail to establish communication with remote partitions that start up later, and usually needs to wait for those remote partitions to come and look for their corresponding windows on the first partition. In a system where it is permitted to install or activate cells while the system is running, the first CPU 14 may set up a sharing window 30, and even sharing channels 30i, for use with a second cell 13 that does not form part of the system at the time when the window is set up. Any such windows or channels then remain inactive unless and until the intended second cell 13 is activated and carries out the steps described above with reference to FIGS. 3 and 4.

Figure 5:
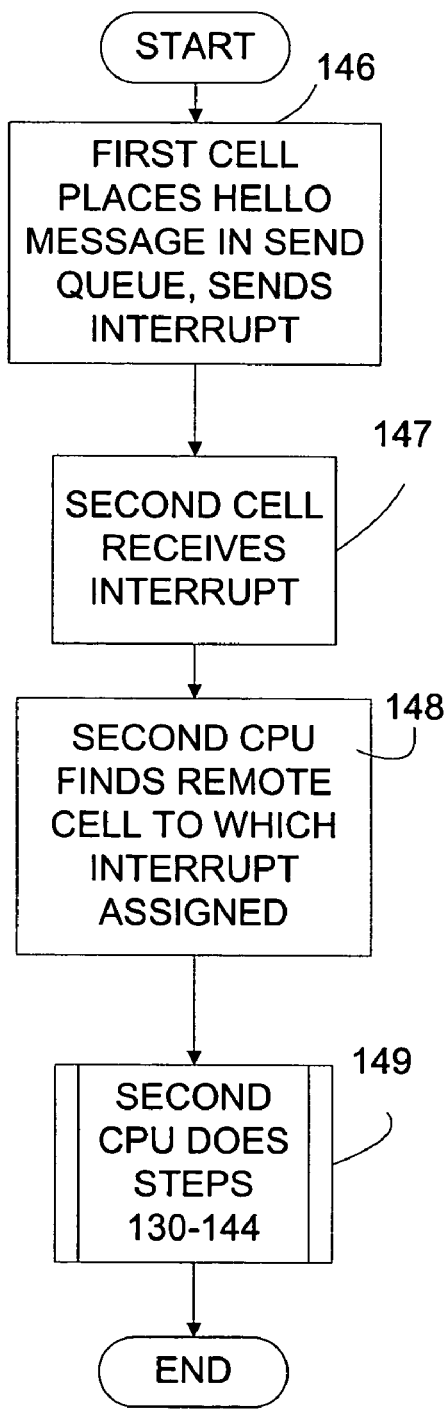
FIG. 5 is a flowchart of an embodiment of a process for establishing a channel in response to a message interrupt.

Referring now to FIG. 5, if a first processor 14 finds a remote channel 30i and sends an interrupt to that channel at step 146, the interrupt handler 24 of the second cell 13 receives that interrupt at step 147. Because the interrupt is specific to a channel 30i that has the status of "opening" assigned in step 118, the second partition will construe it as a request to open the channel 30i.

The request is in the form of an interrupt sent by the CPU of the first partition 10 to the interrupt handler 24 of the second partition 12. The interrupt as sent is a packet containing the actual interrupt vector, which is the message from the first processor 14 to the second processor 16, and the addresses of both processors. In the present embodiment, the destination address given preferably identifies a single processor 16. The interrupt handler 24 of the second partition validates the interrupt as will be described below with reference to FIG. 7.

Assuming that the interrupt handler 24 accepts the incoming interrupt from the first CPU 14 and forwards the interrupt to the second CPU 16, the second CPU then proceeds to establish contact with the first CPU that sent the interrupt. In the present embodiment, the interrupt handler 24 does not forward to the second CPU 16 the source address of the interrupt, but only the actual interrupt vector. The specific interrupt vector, sent to the specific second CPU 16, uniquely identifies the local channel within partition 12, but not the remote channel. In step 148, the second CPU 16 then determines which other processor is attempting to communicate with it. If the channel assignments are predetermined, the second CPU 16 may look up the remote channel to which the local channel in question is assigned, and contact the assigned remote channel.

Alternatively, the second CPU 16 may have to search for a remote channel that contains a "hello" message for the local channel in question. Step 148 may therefore consist of repeating the subsequent step 149 of FIG. 5 until the second processor 16 finds the waiting "hello" message. If the channels are partially preassigned, the second CPU 16 may be able to deduce an approximate origin for the interrupt, and poll only remote sharing windows 30 for that approximate origin. Alternatively, if the source address is forwarded along with the interrupt, the second CPU 16 can read the source address in step 148, and the second CPU may then carry out step 149 of FIG. 5 to poll only sharing windows 30 in the cell 11, partition 10 or other neighborhood identified by the source address in the interrupt. If the received interrupt conveys an incomplete source address, the interrupt handler 24 must queue and forward similar interrupts from different sources, and the second processor 16 must process each such interrupt separately.

At step 149, the second CPU 16 carries out the process of steps 130-144 of FIG. 4, to find at least the remote channel that sent the interrupt in step 147.

As described with reference to step 146, the second processor 16 may send an interrupt to the first processor 14 to inform it that there is now an available channel 30i in an open sharing window 30 on the second partition 12. Alternatively, the first processor 14 may wait for a suitable delay after sending the interrupt in step 146, and then in step 149 the first processor 14 repeats steps 130 to 144 to determine that there is now a sharing window 30 open for the first processor 14 on the second partition 12.

If at a point in the process described with reference to FIGS. 3 and 4 it is found that a sharing window 30 is already open and is available for communication between the first and second partitions 10, 12, that no available channel is open in that window, and that there is an unopened channel available, then only the parts of FIG. 3 and/or FIG. 4 relating to the setting up of channels need be carried out in respect of the existing window.

Figure 6:
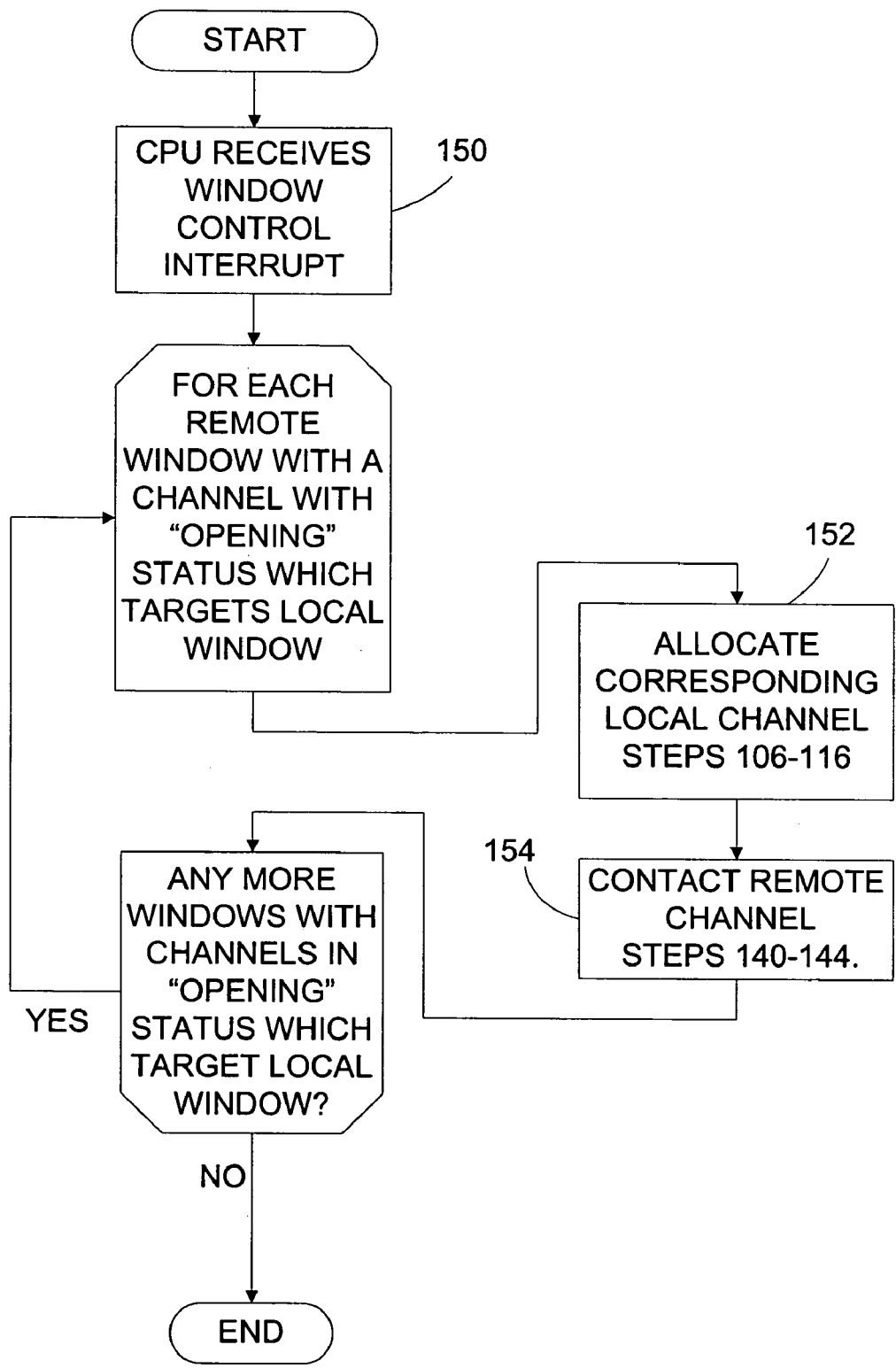
FIG. 6 is a flowchart of an embodiment of a process for establishing a channel in response to a window control interrupt, either when specific channels are not preallocated, or when the first partition request a new channel be added to an existing window.

Referring now to FIG. 6, when a first partition 10 wishes to communicate with second partition 12, the first partition may find that the second partition has a sharing window 30 accessible to that first partition, but that none of the channels 30i within that sharing window is available to the first partition. This may occur because the appropriate second channel 30i has not yet been set up, or because the first partition wishes, and is allowed, to increase the number of channels in use between the two partitions. In that case, the first partition 10 sets up an appropriate local channel 30i, and then sends to the second partition the window control interrupt assigned in step 104.

In step 150, the CPU of the second partition receives the window control interrupt sent by the first partition, either because the first partition wishes to increase the number of channels allocated to it, or because the channel allocation had only partly been set up. In response to the window control interrupt, in step 152 the second partition sets up a new channel 30i in the second window 30. In step 154 the second partition then locates the remote channel on the first partition 10 and establishes communication as described above. Because the window control interrupt does not specifically identify the cell that sent the interrupt, the second partition searches for suitable remote windows, as shown in FIG. 6. In this case, it may not be necessary to carry out the whole of the searching and matching process shown in FIG. 4, because the second partition 12 knows that the window control interrupt must have come from a cell that is permitted to read the second window 30 and to send the window control interrupt to the second partition. If specific pairs of windows are pre-assigned, the search may be further restricted to windows on potential first cells that can properly share a pair of channels with the second window 30 in question.

Figure 7:
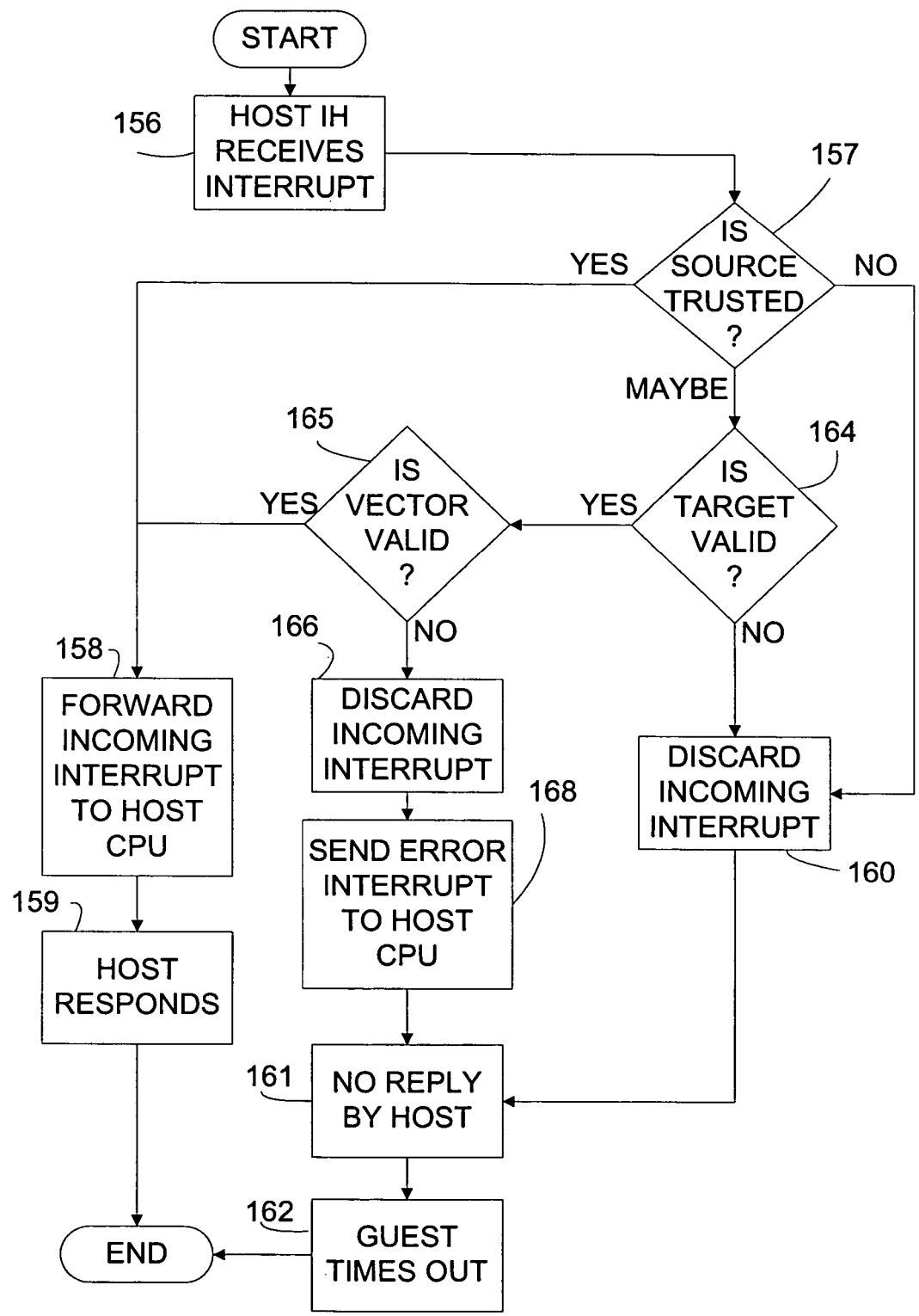
FIG. 7 is a flowchart of an embodiment of a process for handling incoming interrupts.

Referring to FIG. 7, whenever the interrupt handler 24 of a partition receives an interrupt, a validation process is carried out. In FIG. 7 the partition receiving the interrupt is referred to as the second partition 12, but in the present embodiment the same validation procedure is carried out by any interrupt handler receiving an incoming interrupt. At step 156, the interrupt handler 24 receives the interrupt, and at step 157 the interrupt handler inspects and assesses the source and destination addresses of the interrupt. If the source is a processor that is highly trusted by the target CPU 16, for example, a processor in the same partition 12 as the target CPU 16, then the interrupt handler 24 may forward the interrupt without further examination at step 158. In step 159, the host takes whatever action is appropriate in response to the interrupt.

If the source of the interrupt is not a processor from which the target CPU 16 accepts interrupts, then the interrupt may at step 160 be discarded without further examination. At step 161 the host processor does not respond to the guest processor 14. In due course, at step 162 the guest processor 14 times out and abandons the attempt at communication.

If the source of the interrupt is a processor 14 in another partition 10 from which the host processor 16 accepts some but not all interrupts, then the interrupt handler 24 inspects the substance of the interrupt. At step 164 the interrupt handler 24 checks the target processor to which the interrupt is addressed against the INT_TARGET_ENABLE register. If the target processor is not allowed, the interrupt is discarded at step 160.

If the target processor is allowed, at step 165 the interrupt vector is checked against the INT_VECTOR_ENABLE register. If the target vector is not allowed, the original interrupt is discarded at step 166, and is replaced at step 168 by an interrupt to the target processor specified in the original interrupt, but with an interrupt vector specified by the INT_ERROR_VECTOR register. If the target vector is allowed, the interrupt handler 24 sends the interrupt to the processor 16 at step 158. In the present embodiments, an interrupt from a first processor 14 in a different partition is typically acceptable if, and only if, it has been assigned in step 104 as a Window Control Interrupt or in step 116 as a channel Message Interrupt.

Figures 8, 9:
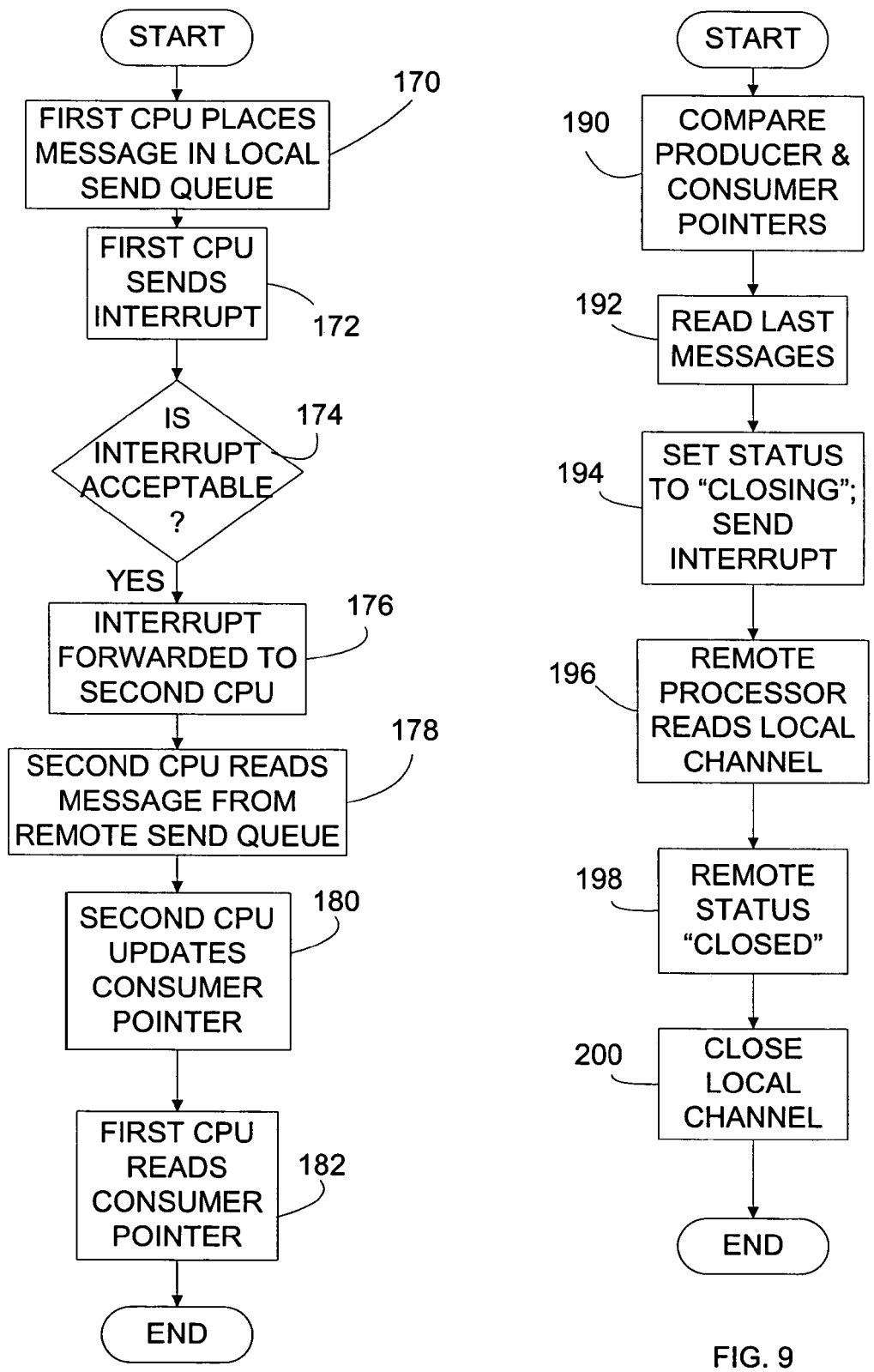
FIG. 8 is a flowchart of an embodiment of a process for transferring data between partitions.
FIG. 9 is a flowchart of an embodiment of a process for closing a channel.

Referring now to FIG. 8, once communication is established using a pair of channels in sharing windows 30 on the partitions 10, 12, if, for example, the first processor 14 wishes to send a message to the second partition 12, in step 170 the first processor 14 places the message in send queue 32*i* of a channel 30*i* in the sharing window 30 in the local partition 10. The first processor 14 updates its producer pointer 34*i* to point to the end of the message. In step 172, the first processor 14 sends to the second processor 16 a message interrupt. The first processor sends the interrupt vector learned in step 144 to the interrupt target learned in step 144. In step 174, as with other incoming interrupts, the second partition's interrupt handler 24 inspects the interrupt as described above with reference to steps 156 to 168. Assuming that the interrupt is acceptable, it is forwarded to the second CPU 16 in step 176. The interrupt informs the second CPU 16 that there is a new message for the second CPU 16 in the assigned channel 30*i* of the remote sharing window 30. Because the interrupt is a specific interrupt assigned in step 116, and because communication between a pair of a remote channel and a local channel has been established in steps 130 to 156, the second CPU 16 knows which remote cell's channel the message is in.

Using a cached address for the remote channel, the second CPU 16 can immediately read in step 178 the message that the first CPU 14 has placed there. To show that it has read the message, in step 180 the second processor 16 updates the consumer pointer 36 to point to the end of the message in the remote send queue 32*i* that the second processor has read. The second processor 16 does not have any write access to the first partition 10, so it updates the consumer pointer 36 in the sharing channel 30*i* in the second partition 12. In step 182, the first processor 14 reads the consumer pointer 36 in the second partition's sharing window 30 to confirm that the second processor has read the message from the first partition's send queue 32*i*.

It will be seen that a conversation between the two processors may proceed with each processor in turn repeating steps 170 to 182, and the two processors signaling progress by updating their producer pointers 34 and consumer pointers 36. Eventually, the conversation ends.

If it is desired to close a channel, either CPU 14 or 16 may initiate the closing, or both may initiate closing simultaneously. The following assumes that the first CPU 14 initiates the closing. Referring now to FIG. 9, in step 190 the first CPU 14 first compares the remote consumer pointer 36 and the local producer pointer 34. In step 192, if the remote processor has not yet read the last message in the local send queue, the first processor 14 must wait for it to do so. If the first processor 14 has not yet read the last message in the remote send queue, the first processor reads that message, and updates the local consumer pointer to show that the message has been read.

In step 194, the first processor 14 then changes the status of its own channel to "closing" and sends the channel message interrupt. In step 196, the second processor 16 reads the channel in the remote window 30. The second processor sees that there is no new message, and that the status is set to "closing." In step 198, the second processor 16 acknowledges by setting the status of its own channel to "closed" and sending a channel message interrupt to the first processor 14. In step 200, the first processor 14 sees that acknowledgment, and sets the status of the local channel to "closed." Each processor may then deallocate the channel message interrupt and set to null any of the header data set in steps 106 to 110 that is not fixed by the window definition.

When all of the channels in a sharing window 30 are closed, the window may be closed by setting the lower and upper bounds registers 26, 28 to a null or invalid setting, setting the sharing set register 38 to a "deny all" or null setting, and de-allocating the memory allocated for the window itself, the window control interrupt assigned in step 104, and any channel message interrupts that were not de-allocated in step 200. A window 30 may be closed while the system is running because the cell 11, 13 or partition 10, 12 within which that window is located needs to close down or restart, or otherwise needs to free resources that were assigned to the window. This may leave another cell or partition with an open window that contains no open channels. In the present embodiment, that window is usually kept open, so that when the cell with the closed window restarts it can easily re-establish communication by following the steps described above with reference to FIGS. 3 and 4. If a cell needs to be removed and replaced, the new cell can then take up the window and channel assignments of the removed cell, without the need to reconfigure any of the other cells or partitions. If one cell in a partition is disconnected, the other partitions with which the disconnected cell is in communication may be instructed to establish additional pairs of channels with other cells in the same partition as the disconnected cell. When the disconnected cell is restored or replaced, these additional connections can then be closed, and the connections to the disconnected cell restored.

After a window or channel interrupt is de-allocated, the processor then checks the INT_TARGET_ENABLE and INT_VECTOR_ENABLE registers and, if no other window control interrupt or channel control interrupt is still using the same vector or target, sets the vector or target as non-allowed.

Because of the controls on interaction between the two partitions 10 and 12 in the present embodiment, the system shown in FIGS. 1 to 9 is highly resistant to failure of any part of the system. A failure in the guest partition will not generally impact the host partition. When an unrecoverable error occurs in the guest partition, the guest partition shuts down but the host partition continues operation. At worst, the host partition will not receive confirmation that the guest partition has read a message in a sharing window 30, and the connection will eventually time out.

Figure 10:
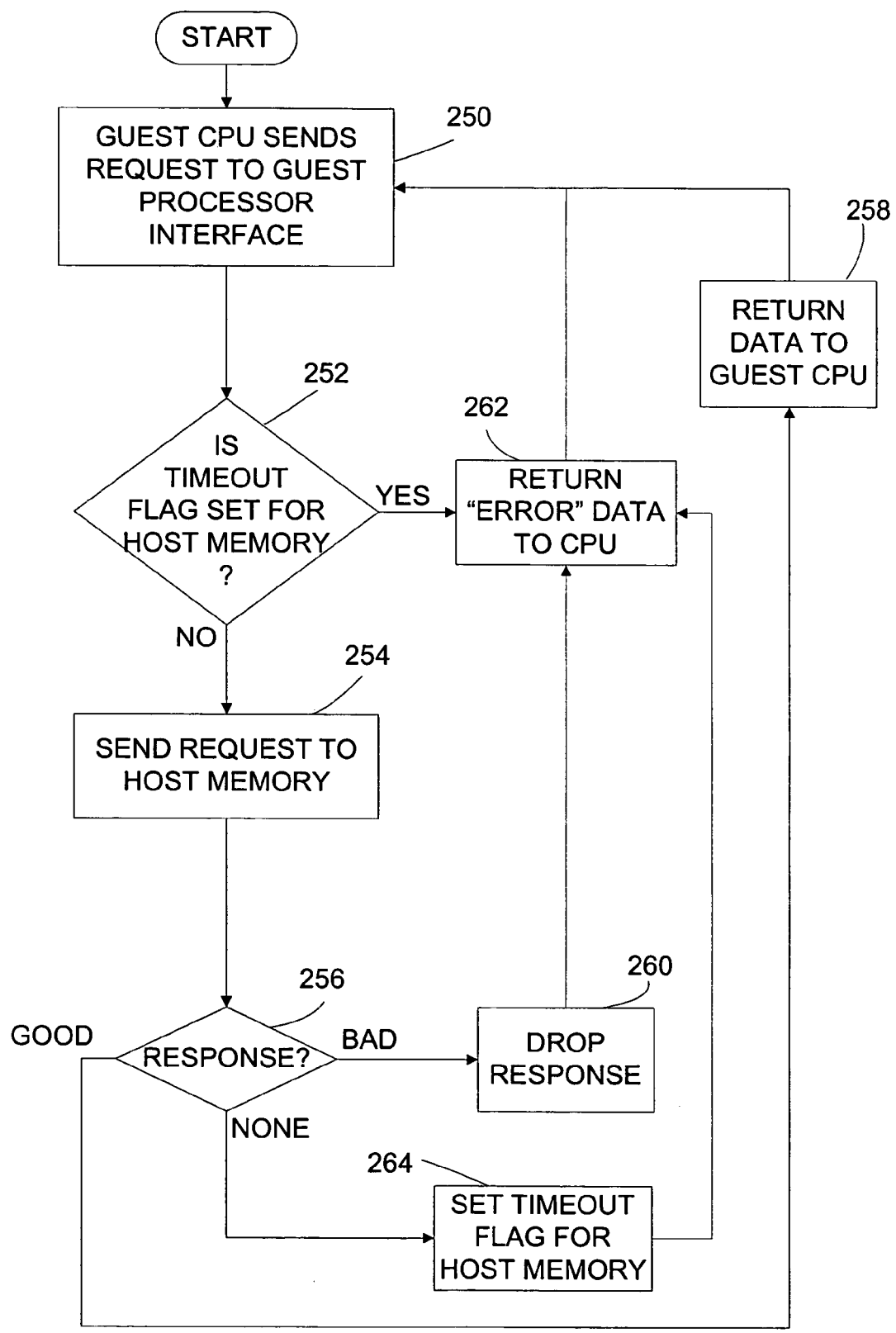
FIG. 10 is a flowchart of an embodiment of a process for a guest partition requesting data from a host partition.

Referring now to FIG. 10, in step 250 the guest partition 10 may wish to acquire data from the host partition 12, and sends an appropriate request to its processor interface 15. In step 252 the guest processor interface 15 checks whether a "timeout flag" for the host memory 20 has been set. The timeout flag is initially unset, so the first time that the process reaches step 252, it branches to NO. In step 254, the guest processor interface 15 then requests the data from the host memory 20. If in step 256 the host partition sends a "good" response, that is to say, a clear and valid response supplying the requested data, then in step 258 the guest processor interface 15 returns the data to the requesting guest CPU 14. If the connection did not fail, or has recovered, the guest partition 10 will cycle through steps 250 to 258 each time it requires data from the host memory 20.

If in step 256 the processor interface 15 of the guest partition 10 receives an unrecognizable, incomplete, or otherwise unusable, response to the request, the processor interface 15 drops the response in step 260, and returns an error message to the requesting CPU in step 262. In this embodiment, the error message may consist of a data packet with a content that cannot be valid. For example, the guest processor interface 15 may supply the guest CPU 14 with a data packet containing entirely 1's, where the packet format precludes any valid packet from consisting entirely of 1's. The process then returns to step 250 without taking any further action. If at step 256 no response at all is received from the host memory 20 to the request, the guest processor interface 15 waits until the end of a timeout period, to ensure that the response is absent and not merely tardy. In step 264, the guest processor interface 15 then sets the timeout flag for the host memory 20, before proceeding to step 262 to fabricate a message returning the "error" data to the requesting CPU.

If, after the timeout flag is set in step 264, the guest processor interface 15 receives a request in step 250 for a further block of data from the host memory 20, then step 252 shows that the timeout flag is set, and the guest processor interface 15 proceeds directly to step 262 to fabricate a message returning the "error" data to the requesting CPU. The timeout flag effectively tells the process of FIG. 10 to assume that the connection to the host memory 20 has been completely lost. The guest partition 10 is thus by-passing the time that would otherwise be spent at step 256 waiting for the timeout period to expire.

Thus, as a result of a missing or garbled response to a request for data, the guest partition 10 may deem the connection to the host partition to have been lost, when there was in fact only a transient interruption and subsequent attempts to contact the host memory 20 would have succeeded. The worst consequence of this is that subsequent work by the guest partition may be unnecessarily hindered by the unavailability of data from the host partition, leading to some lost processing time.

Figure 11:
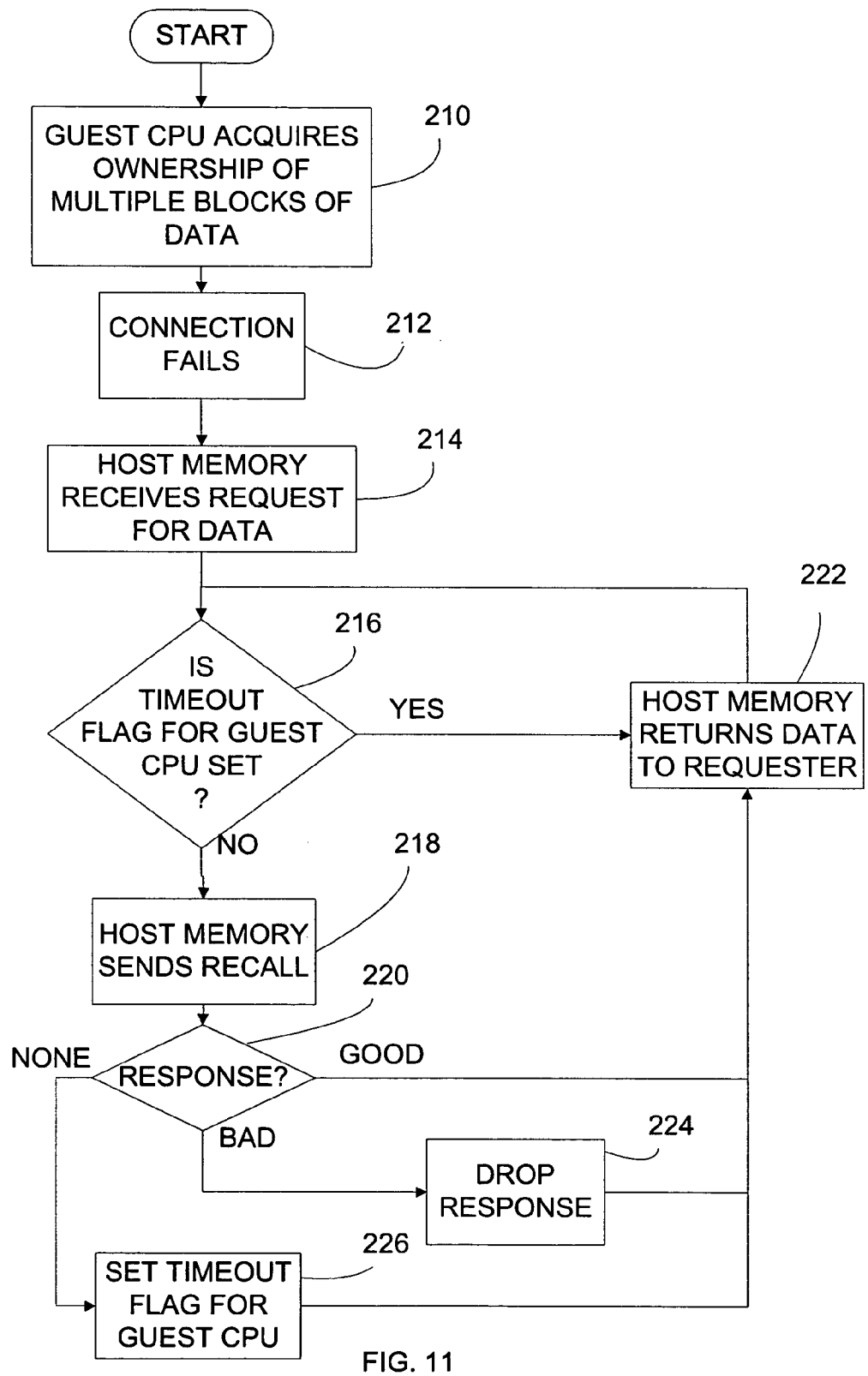
FIG. 11 is a flowchart of an embodiment of a process for a host partition recalling data ownership that has been granted to a guest processor.

Referring now to FIG. 11, in step 210 a guest partition 10 may acquire "ownership" of multiple blocks of data from a host partition 12. In the present embodiment, the grant of ownership does not usually convey "write" permission to change that data, but conveys a guarantee that the data will not be changed. The host partition 12 therefore suspends its own "write" permission to change that data. If in step 212 the connection between the two partitions fails under those conditions, then the host partition 12 may not know whether the guest partition 10 still needs the data to remain current. The connection may fail because of a problem in the guest partition 10, or in the fabric connecting the two partitions. It may not immediately be clear to the host partition 12 how severe the failure is. Indeed, the host partition 12 may not discover that there is a failure until it next tries to communicate with that guest partition 10. If the guest partition 10 experiences a fatal error and needs to shut down, it would ideally return all data borrowed from other partitions, but it may not be able to.

In step 214, the host memory 20 may receive another request for one of the blocks of data owned by the guest CPU 14, which request is inconsistent with the guest partition's ownership of the data. In step 216 the host memory 20 checks whether a "timeout flag" for the guest CPU 14 has been set. The timeout flag is initially unset, so the first time that the process reaches step 216, it branches to NO. In step 218, the host memory 20 then attempts to "recall" the data, which effectively revokes the guest partition's right to trust that the data is current. If in step 220 the guest partition sends a "good" response, that is to say, a clear and valid response accepting the recall and surrendering ownership of the data, then in step 222 the host memory 20 returns the data to the requesting CPU. If the connection did not fail, or has recovered, the host memory 20 will cycle through steps 214 to 222 each time it receives a request for data that necessitates recalling ownership from the guest CPU 14.

If in step 220 the memory 20 of the host partition 12 receives an unrecognizable, incomplete, or otherwise unusable, response to the recall request, the memory drops the response in step 224, and returns the data to the requesting CPU in step 222. The process then returns to step 214 without taking any further action. If at step 220 no response at all is received from the guest CPU 14 to the recall request, the host memory 20 waits until the end of a timeout period, to ensure that the response is absent and not merely tardy. In step 226, the host memory 20 then sets the timeout flag for the guest CPU 14, before proceeding to step 222 to fabricate a message returning the data to the requesting CPU.

If, after the timeout flag is set in step 226, the host memory 20 receives a request in step 214 for a further block of data that is owned by the guest processor 14, then step 216 shows that the timeout flag is set, and the host memory 20 proceeds directly to step 222 to fabricate a message returning the data to the requesting CPU. The timeout flag effectively tells the process of FIG. 11 to assume that the connection to the guest CPU 14 has been completely lost. The host memory 20 is thus by-passing the time that would otherwise be spent at step 220 waiting for the timeout period to expire.

Thus, as a result of a missing or garbled response to a recall message, the host partition 12 may deem the recall to have succeeded and free the data for the host partition to alter, when the guest partition 10 has not received the recall message. The worst consequence of this is that subsequent work by the guest partition may rely on the recalled data when that data is no longer valid, leading to some wasted work.

Because the guest partition has no power to write to the host partition sharing window, the integrity of the data in the sharing window will not be affected. It is therefore possible for the host partition to use the data area 32 of a sharing window as active working memory. Alternatively, messages may be prepared in non-shared memory, and a copy may then be placed in the sharing window 30 solely for the purpose of sharing. The copy placed in the sharing window may then readily be provided with check-words or other authentication data generated specifically for the purpose of sharing. In the present embodiment, a message consisting entirely of 1s is used as an error signal. Therefore, when sending data that could consist of a long string of 1s, check bits or check words may be included, and may be defined so that a message of data is never entirely 1s.

In the present embodiment, a failure in the host partition will impact the guest partition only to the extent that the guest partition cannot obtain requested data. Even a "fatal" error in the host partition will not be fatal for the guest partition. When an unrecoverable error occurs in the host partition, the host partition shuts down, but the guest partition can continue operation. However, in this embodiment the failure will be communicated either in the form of an explicit error message from the host partition to the guest or by failure to respond before a time out. A failure to respond can be converted into an explicit error message by the processor interface on the guest partition. The guest partition can then proceed with appropriate damage mitigation measures. A failure in the common communications media between the two partitions will similarly result only in the conversation timing out.

When an unrecoverable error occurs in a fabric providing communication between the host and guest partitions, each partition may continue operation, but may treat communications between the two partitions in the same way as if the other partition had shut down following an unrecoverable error. However, in the present embodiment the communication fabric that connects different partitions may also be used for communications between cells within a partition. Consequently, a failure in the fabric may constitute a failure within one or both partitions independently of its impact on communication between the two partitions.

The controls on interaction between partitions in the present embodiment also preclude many mechanisms by which a hostile partition might deliberately attempt to interfere with another partition. Hostile information can be transferred between the partitions 10 and 12 only by persuading the consumer to read it from the producer's sharing window 30. However, the handling of the material that has been read is under the control of the consumer partition, which can be as cautious as it wishes in controlling the material. Because the consumer partition will read only the contents of the data area 32$i$ of the allocated channel or window, which is of a defined size, in this embodiment security violations caused by an over-length message overflowing a designated writable area in the recipient partition are excluded.

Communication speeds in the present embodiment can be high, because the communication between partitions can use the high-speed communications paths already provided between the different processors in a multiprocessor computer system. Security is ensured by the very strict control that is maintained over the nature and content of the messages that are permitted, and by discarding any message that does not comply.

Although the invention has been described and illustrated with reference to exemplary embodiments thereof, it will be understood by those skilled in the art that various changes, omissions, and additions may be made thereto, without departing from the spirit and scope of the invention as recited in the attached claims. For example, the process shown in FIG. 1 has been described as between a single guest processor 14 in a single guest partition 10 and a single host processor 16 in a single host partition 12. However, as has been explained above, there may be more than two partitions, and there may be more than one CPU in each partition. If there may be more than one CPU per partition, then the sharing windows may be arranged to link individual CPUs. In particular, if a system is structured into cells, each comprising one or more processors, memories and ancillary devices, the sharing windows may link cells. Cells may then be grouped together into partitions, merely by changing the permissions that each cell grants to specified other cells. If there is more than one physical path for interrupts or other messages to enter a cell, the procedures described above for determining which interrupts or other messages to admit and which to exclude may be carried out in parallel at each entrance to the cell.

Where there are more than two partitions, cells, or other entities that are linked together by the sharing windows 30, each entity may have as many sharing windows 30 as there are other entities with which that entity needs secure communication. Alternatively, as mentioned above, it is possible for communication paths from a first processor to second and third processors, say, to use different channels in a single window within the first partition. Because the second and third processors have only read access to that window, such an arrangement does not create any real risk that a failure on the second processor, for example, could adversely affect the third processor. Different sharing windows 30 on a single cell, partition, or other entity may have sharing set registers 38 that allow different other partitions access to them. Where a specific sharing window 30 is assigned to communication with a specific other partition or cell, the sharing set register 38 may be set to allow only the specific other partition or cell to read that sharing window.

Where there is more than one conversation taking place simultaneously, each conversation may use a separate pair of sharing windows 30, one in each of the partitions that are involved in that conversation. A failure in one conversation will then not affect other conversations, except insofar as all of the conversations independently use the resource that has failed. Alternatively, a single sharing window 30 may be used for several conversations. If the several conversations are unrelated, they may each be assigned a channel, occupying a separate part of the sharing window 30, with its own producer pointer 34$i$, consumer pointer 36$i$, and remote channel ID 37$i$. This reduces the overhead involved in maintaining distinct sharing windows 30.

A broadcast connection may be established using a sharing window 30 that can be read by a large number of other partitions 10. If reliable broadcasting is to be ensured, each reading partition 10 must assign a corresponding channel with a consumer pointer 36$i$, and the broadcasting partition 12 must check that all of the reading partitions have updated their consumer pointers 36$i$, to show that they have read the broadcast, before overwriting the broadcast with further data. Alternatively, if connections are normally open between most or all pairs of partitions, broadcast messages may be sent to each recipient partition separately using the partition-to-partition connections.

What is claimed is:

1. A method of communication between a first and a second partition, comprising:

initiating communication between a first and a second partition by:

the first partition placing in a first communication window in the first partition a request for communication with the second partition;

the first partition sending to the second partition an interrupt indicating that there is new information to be read within the communication window in the first partition; and the second partition, in response to the interrupt, reading communication windows accessible to it to identify the first communication window;

the second partition placing in a second communication window, in the second partition, accessible to the first partition a responsive message;

the second partition sending to the first partition an interrupt indicating that there is new information to be read within the second communication window;

the first partition reading the message in the second communication window;

the first partition placing information in an address area in the first partition accessible to the second partition;

the first partition, after placing information in the accessible address area, sending to the second partition an interrupt indicating that information is accessible to be read; and the second partition reading the information from the accessible address area.

2. A method according to claim 1, further comprising:

the second partition placing information in an address area in the second partition accessible to the first partition;

the second partition sending to the first partition a signal to indicate that there is information in the accessible address area in the second partition; and the first partition reading the data in the accessible address area of the second partition.

3. A method according to claim 2, wherein each of the accessible address areas contains information, readable to the other partition, indicating how much the partition within which the accessible address area in question is has read of the contents of the accessible address area in the other partition.

4. A method according to claim 3, wherein each of the accessible address areas contains information, readable to the other of the first and second partitions, indicating how much the partition within which the accessible address area in question is has written of the contents of the accessible address area in question.

5. A method according to claim 1, comprising the second partition, after reading the information, placing in an address area accessible to the first partition an indication that the information has been read, and the first partition reading that indication.

6. A method according to claim 1, comprising associating the accessible address area in the first partition with an accessible address area in the second partition, and communicating between the first and second partitions by exchanges of information in the associated accessible address areas.

7. A method according to claim 1, comprising running a plurality of distinct processes in at least one of the first and second partitions, and wherein different channels are used for communication between different pairs of processes within the first and second partitions.

8. A method according to claim 7, wherein the distinct processes are different operating systems running on a shared processor.

9. A method according to claim 7, wherein the distinct processes are different operating systems running on different processors within a partition.

10. A method according to claim 1, comprising defining within each accessible address area a plurality of channels arranged to be written and read independently.

11. A method according to claim 10, further comprising communicating with at least a third partition, comprising placing data to be read by different partitions in different channels within one accessible address area.

12. A method of communicating between first and second partitions in a partitioned computer system having respective first and second memory windows that the other partition is permitted to read, comprising:
the second partition displaying within the second window a window interrupt;
the first partition defining within the first window a first communication channel, and displaying a first channel interrupt;
the first partition sending to the second partition the window interrupt for the second window;
the second partition receiving the window interrupt and locating the first channel;
the second partition defining within the second window a second communication channel and displaying a second channel interrupt;
the second partition sending the first channel interrupt to the first partition;
the first partition locating the second channel within the second window; and
the first and second partitions communicating by means of the first and second channel interrupts and information displayed in the first and second channels.

13. A method according to claim 12, comprising displaying within each of the first and second channels information identifying the other of the first and second channels.

14. A method according to claim 12, comprising displaying within each window a producer pointer indicating a position to which each partition has written data within a data area of its respective channel and a consumer pointer indicating a position to which each partition has read data within a data area of the other of the first and second channels.

15. A method according to claim 12, wherein the second partition displays the window interrupt without first establishing that the first partition is present in the system, and wherein the first partition defines the first communication channel when it is added to the system.

16. A computer readable storage medium containing software that is arranged to run on a local processor in a first partition in a partitioned computing system and to cause the local processor:
to display a window interrupt in a first memory window that other partitions are permitted to read;
upon receiving the window interrupt from another partition, to define within the first window a first communication channel, display a first channel interrupt, locate a second communication channel in a second partition from which the window interrupt was sent, and send to the second partition a channel interrupt associated with the second communication channel;
when the first partition wishes to communicate with a second partition and first and second channels for communication between the first and second partitions are not already available, to define within the first window a first communication channel with an associated first channel interrupt, locate a second memory window in the second partition, and send to the second partition an associated second window interrupt; and
on receiving the first channel interrupt in reply to the second window interrupt, to locate a second channel in the second window that is now available for communication with the first channel.

17. A method of closing first and second communication channels, used for communication between first and second partitions in a partitioned computing system, wherein each partition writes information to the channel in its own partition and reads information form the channel in the other partition, comprising:
the first partition verifying that neither channel contains unread data;
the first partition displaying in the first channel an indication that it is closing the channels and sending to the second partition a signal that there is new information in the first channel;
the second partition receiving the signal, observing the closing indication and finding no new information to read and, in response thereto, displaying in the second channel an indication that the channels are closed, and sending to the first partition a signal that there is new information in the second channel;
the first partition receiving the signal, observing the closed indication and finding no new information to read and, in response thereto, closing the first channel.

18. A method according to claim 17, further comprising the first and second partitions releasing resources assigned to the first and second channels.

19. A method according to claim 17, wherein the communication channels are within communication windows comprising a region of memory accessible to partitions other than the partition in which the window is located, comprising closing all of the channels in a selected window, setting the selected window to a status in which new channels are not permitted to be opened in the selected window, and releasing resources assigned to the selected window.

20. A method of communicating between first and second partitions having respective first and second memory windows that the other partition is permitted to read, comprising:

the first partition defining within the first window a first communication channel, and displaying a first channel interrupt;

the second partition defining within the second window a second communication channel, and displaying a second channel interrupt;

the second partition sending to the first partition the first channel interrupt;

the first partition receiving the first channel interrupt and locating the second channel;

the first partition sending the second channel interrupt to the second partition; and the first and second partitions communicating by means of the first and second channel interrupts and information displayed in the first and second channels.

21. A method of communicating according to claim 20, comprising displaying within each of the first and second channels information identifying the other of the first and second channels.

22. A method according to claim 20, comprising displaying within each window a producer pointer indicating a position to which each partition has written data within a data area of its respective channel and a consumer pointer indicating a position to which each partition has read data within a data area of the other of the first and second channels.

23. A method according to claim 20, wherein the first partition defines the first channel without establishing that the second partition is present in the system, and wherein the second partition defines the second communication channel when it is added to the system.

24. A machine-readable storage medium comprising program code to run on a local processor in a first partition in a partitioned computing system and to cause the local processor:

to define a first communication channel and display a channel interrupt in a first memory window that other partitions are permitted to read;

upon receiving the channel interrupt from another partition, to locate a second communication channel in a second partition from which the channel interrupt was sent, and send to the second partition a channel interrupt associated with the second communication channel; and to communicate with the other partition by means of the first and second channel interrupts and information displayed in the first and second channels.

* * * * *

UNITED STATES PATENT AND TRADEMARK OFFICE
CERTIFICATE OF CORRECTION

PATENT NO.         : 7,650,386 B2
APPLICATION NO.    : 10/902362
DATED              : January 19, 2010
INVENTOR(S)        : Larry N. McMahan et al.

It is certified that error appears in the above-identified patent and that said Letters Patent is hereby corrected as shown below:

In column 20, line 44, in Claim 17, delete "form" and insert -- from --, therefor.

In column 20, line 49, in Claim 17, after "channels" insert -- , --.

Signed and Sealed this

Sixth Day of April, 2010

David J. Kappos
*Director of the United States Patent and Trademark Office*